United States Patent [19]

Spicer

[11] Patent Number: 4,978,086
[45] Date of Patent: Dec. 18, 1990

[54] DEPLOYMENT OF TOWED AIRCRAFT DECOYS

[75] Inventor: Lyndon R. Spicer, Gwent, Great Britain

[73] Assignee: Stc Plc, London, United Kingdom

[21] Appl. No.: 382,282

[22] Filed: Jul. 20, 1989

[51] Int. Cl.$^5$ ............................................. B65H 75/48
[52] U.S. Cl. ................................... 242/107; 242/107.1
[58] Field of Search ........... 242/107.1, 107.11, 107.17, 242/107.13, 107.14, 107.15, 107.6, 107.7, 107; 350/96.23

[56] References Cited

U.S. PATENT DOCUMENTS

| | | | |
|---|---|---|---|
| 1,868,409 | 7/1932 | Crispen | 242/107.1 |
| 3,709,983 | 12/1987 | Plessner | 350/96.23 |
| 4,634,217 | 1/1987 | Levacher et al. | 350/96.23 |
| 4,645,298 | 2/1987 | Gartside | 350/96.23 |
| 4,659,174 | 4/1987 | Ditscheid et al. | 350/96.23 |
| 4,756,600 | 7/1988 | Ramsay et al. | 350/96.30 |
| 4,757,955 | 7/1988 | Simmons | 242/107.6 |
| 4,770,489 | 9/1988 | Saito et al. | 350/96.23 |
| 4,893,893 | 1/1990 | Claxton et al. | 350/96.23 |

Primary Examiner—John M. Jillions
Attorney, Agent, or Firm—Lee, Mann, Smith, McWilliams & Sweeney

[57] ABSTRACT

An arrangement for the deployment of towed aircraft decoys comprising a reel with a hollow hub or flange rotatably mounted on a support, the reel being wound with a composite tether-wire consisting of an optical fiber cable reinforced with a strain member, one end of the tether-wire being anchored to the hub or flange, and within the hub or flange a spiral spring member one end of which is anchored to the hub or flange and the other end of which is anchored to the support, the spring member having attached thereto a flexible optical fiber such that the fiber conforms to the configuration of the spring when the spring is wound or unwound according to rotation of the reel relative to the support, the flexible fiber being connected at one end with the anchored end of the optical fiber cable on the hub or flange and at the other end with an optical connector means on the support, whereby unreeling of the tether-wire results in rotation of the reel and consequent winding up of the spring.

1 Claim, 1 Drawing Sheet

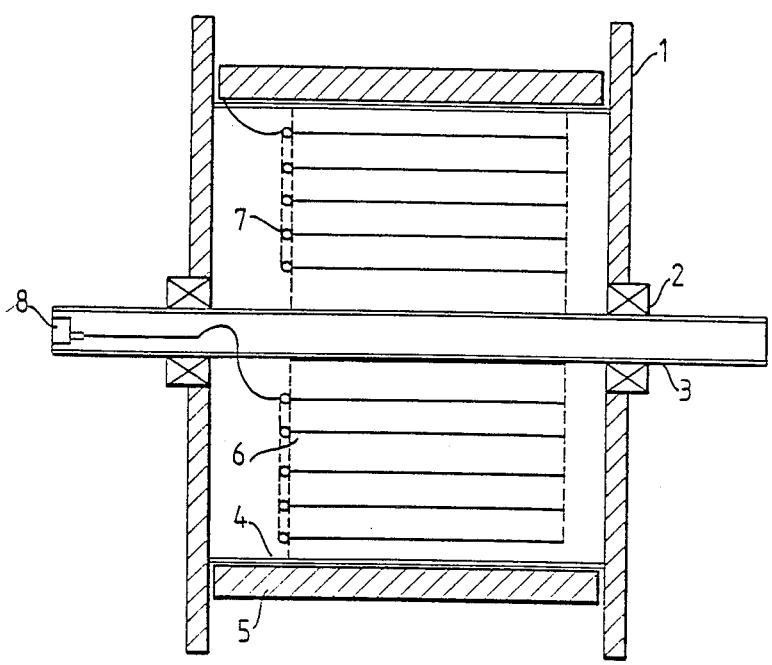

DEPLOYMENT OF TOWED AIRCRAFT DECOYS

BACKGROUND TO THE INVENTION

This invention relates to an arrangement for the deployment of towed aircraft decoys.

There are two basic types of aircraft decoy, self contained and controlled. The self contained decoy can be deployed by a simple tether-wire dispenser. The tether-wire is simply a high tensile wire, probably multi-stranded, and is contained in a simple pay-out dispenser. For decoys which are to be deployed at high aircraft speeds, e.g., at Mach 1 or above, the deployment apparatus should include means for decelerating the separation speed of the decoy as the tether-wire pays out to prevent undue snatching at the moment of maximum deployment. A controlled decoy requires to be tethered to the towing aircraft via a tether cable which not only tows the decoy but can carry an electrical and control cable.

Whereas dispenser techniques may be suitable for small independent decoys, which are tethered by steel wire ropes, this may not be possible where electrical, electro/optical or optical links are required to be connected to the aircraft when the decoy is powered and activated directly from the aircraft. In such a case it may be necessary to deploy the tether from a cable reel.

Deployment from a cable reel has the advantage that no torsional twists will be imposed on the tether and the electrical or optical units it will contain. It should be noted that for every turn in a dispenser coil a backtwist is imparted on the tether as it deploys. Such torsionally imposed backtwists may be undesirable for the system's operational requirements.

However, deployment from a cable reel required solutions to:
(i) A method of decelerating.
(ii) A method of retracting the decoy after deployment.
(iii) Provision of transmission lines from the rotating reel to the signal processing unit on the aircraft.

Whereas slipping clutches and similar devices are obvious solutions to the deceleration problem, such devices are somewhat complex and are not self contained as a single package.

It is already known to construct cable reels embodying a spiral spring arrangement. See for example British Patent No. 1590160. In that instance a printed circuit spring acts not only as a cable deployment device but also as an electrical connection between the rotating spool and the stationary shaft.

However, in the field of electronic control and signalling it is becoming practical to utilize optical fiber transmission in place of electrical transmission via metal conductors, the signals being multiplexed onto a single optical fiber. Nevertheless, difficulties arise in coupling a tether-wire incorporating an optical fiber in a rotating cable reel with the stationary shaft on which the reel is mounted. One possible solution is to use optical slip-rings, but this is not regarded by the applicants as a satisfactory solution. Optical rotary joints are not currently available for single mode fiber.

SUMMARY OF THE INVENTION

According to the present invention there is provided an arrangement for the deployment of towed aircraft decoys comprising a reel with a hollow hub or flange rotatably mounted on a support, the reel being wound with a composite tether-wire consisting of an optical fiber cable reinforced with a strain member, one end of the tether-wire being anchored to the hub or flange, and within the hub or flange a spiral spring member one end of which is anchored to the hub or flange and the other end of which is anchored to the support, the spring member having attached thereto a flexible optical fiber, such that the fiber conforms to the configuration of the spring when the spring is wound or unwound according to rotation of the reel relative to the support, the flexible fiber being connected at one end with the anchored end of the optical fiber cable on, the hub or flange and at the other end with an optical connector means on the support, whereby unreeling of the tether-wire results in rotation of the reel and consequent winding up of the spring.

BRIEF DESCRIPTION OF THE DRAWINGS

The invention will now be described with reference to the accompanying drawing which depicts a cross section through a decoy deployment arrangement.

DESCRIPTION OF THE INVENTION

An arrangement for the deployment of a towed aircraft decoy comprises a reel 1 rotatably mounted via bearings 2 on a fixed support 3. The reel has a hollow hub 4 on which is wound a composite tether-wire 5. The tether-wire consists of an optical fiber cable reinforced with a strain member. The tether-wire is anchored at one end to the reel hub and its other end is available for attachment to the towed decoy. Within the hub 4 is a spiral flat spring 6 one end of which is attached to the support 3, the other end being attached to the inside of the hub 4. The spring 6 has bonded to one edge a non-reinforced flexible optical fiber 7. One end of the flexible optical fiber 7 is connected to the optical fiber cable 5 wound on the reel, the other end of the flexible fiber is connected to an optical connector means 8 on the fixed support 3.

In use when the decoy is released from the towing aircraft the tether-wire 5 is unreeled by the decoy as the latter recedes from the aircraft. The resulting rotation of the reel 1 causes the spring 6 to be wound up, producing an increasing tension in the spring opposing the unreeling tension in the tether-wire. This results in a deceleration of the decoy speed relative to the towing aircraft so that as the tether-wire reaches the fully unreeled state, therefore preventing further separation of the decoy from the aircraft, any snatch in the tether-wire is minimised.

The major requirements for the tether-wire construction are tensile strength, diameter, reelability and resistance to microbending. To minimise the cable diameter the tensile strength is best provided by the use of aramid fibers, such as are sold under the Registered Trade Mark "KEVLAR", such fibers are typically stranded around a silica optical fiber in a contra-helical lay configuration to ensure a stable cross section during reeling. A final outer jacket of extruded elastomer is provided to prevent chafing and to improve layering onto the reel. Resistance to microbending can be achieved by the use of a silicone elastomer, such as that sold under the trade name "SYLGARD", as a primary coating to the silica fiber. Alternatively a triple plastics coated glass optical fiber can be used, such as is disclosed in U.S. Pat. No. 4,756,600.

It is well known that in winding up a flat spiral spring the winding forces increase as the spring is more tightly wound. It is use of this phenomenon which provides the deceleration of the decoy once it is released from the towing aircraft. It will be appreciated that the force applied to the tether is due primarily to the drag forces on the decoy. The design of the spring can readily be calculated to ensure that the initial resistance to the drag forces is low, allowing rapid initial deployment of the decoy, followed by increasing resistance during the later stages of deployment until, at the end of he deployment, the spring resistance is nearly equal to the drag forces. The deployment is thus decelerated to minimize snatch at the moment of full deployment. The design criteria for the spring can be readily determined using standard reference works, e.g., "Spiral Torsion Springs in Rectangular Section". When the towing aircraft decelerates, e.g., prior to landing, the spring tension assists in the retraction of the decoy.

I claim:

1. An arrangement for the deployment of towed aircraft decoys comprising a reel with a hollow hub or flange rotatably mounted on a support, the reel being wound with a composite tether-wire consisting of an optical fiber cable reinforced with a strain member, one end of the tether-wire being anchored to the hub or flange, and within the hub or flange a flat spiral spring member one end of which is anchored to the hub or flange and the other end of which is anchored to the support, the spring member having bonded to one edge thereof a flexible non-reinforced optical fiber such that the fiber conforms to the configuration of the spring when the spring is wound or unwound according to rotation of the reel relative to the support, the flexible fiber being connected at one end with the anchored end of the optical fiber cable on the hub of flange and at the other end with an optical connector means on the support, whereby unreeling of the tether-wire results in rotation of the reel and consequent winding of the spring.

* * * * *